(12) United States Patent
Bloching et al.

(10) Patent No.: US 7,725,907 B2
(45) Date of Patent: May 25, 2010

(54) DEFAULT VALUE INITIALIZATION OF BUSINESS OBJECTS

(75) Inventors: Uwe Bloching, Nussloch (DE); Frank Brunswig, Heidelberg (DE); Thomas Fiedler, Pfinztal (DE); Martin Hartig, Speyer (DE); Frank Jentsch, Muehlhausen (DE); Adam Polly, Stutensee (DE); Stefan Rau, Dielheim (DE); Bare Said, St. Leon-Rot (DE); Steffen Tatzel, Nussloch (DE)

(73) Assignee: SAP AG, Walldorf (DE)

( * ) Notice: Subject to any disclaimer, the term of this patent is extended or adjusted under 35 U.S.C. 154(b) by 817 days.

(21) Appl. No.: 11/646,366

(22) Filed: Dec. 28, 2006

(65) Prior Publication Data

US 2008/0162264 A1    Jul. 3, 2008

(51) Int. Cl.
G06F 13/00    (2006.01)
(52) U.S. Cl. .................. 719/330; 719/316; 707/102
(58) Field of Classification Search ............ 719/316, 719/330; 707/102
See application file for complete search history.

(56) References Cited

U.S. PATENT DOCUMENTS

2005/0223084 A1*  10/2005  Cheng ..................... 709/219
2006/0041525 A1*   2/2006  Manfredi et al. ............ 707/1

OTHER PUBLICATIONS

Communications and Search Report from the European Patent Office in EP No. 07 023 883.7, dated Mar. 6, 2008.

* cited by examiner

*Primary Examiner*—Andy Ho
(74) *Attorney, Agent, or Firm*—Finnegan, Henderson, Farabow, Garrett & Dunner LLP

(57) ABSTRACT

Methods and apparatus, including computer program products, provided default values for business objects. In one exemplary embodiment, there is provided a method for providing default values for attributes of business objects. The method may comprise receiving, at a first service provider, a call to instantiate a first business object. The method may then obtain a static default value of an attribute associated with the first business object. A second service provider may be called to determine a dynamic default value for the attribute based on the static default value. The first service provider may then be provided with the dynamic default value for use when instantiating the first business object.

20 Claims, 6 Drawing Sheets

DEFAULT VALUE INITIALIZATION OF BUSINESS OBJECTS

FIELD OF THE INVENTION

The present invention generally relates to data processing. More particularly, the present invention relates to systems and methods for providing default values for business objects.

BACKGROUND OF THE INVENTION

The way enterprises conduct business continues to advance. The key for an enterprise to succeed in this environment often depends on how quickly the enterprise's information technology (IT) organization adapts to evolving business needs. Therefore, a major challenge to these enterprises is how they handle change. To enable business agility, enterprise applications must be not only high-performance business engines, but also be flexible building blocks of future business systems.

A recent promising solution has risen in the form of services. A service, such as a Web service or other program accessible through a network, may represent a self-contained, self-describing piece of application functionality that can be found and accessed by other applications. A service may be considered self-contained because the application using the service does not have to depend on anything other than the service itself, and self-describing because all the information on how to use the service can be obtained from the service itself. The descriptions may be centrally stored and accessible through standard mechanisms.

Instead of requiring programmers to establish and maintain links between applications, services can be loosely coupled, making connections simpler and more flexible and allowing application architects to more easily find and understand services offered by other cooperative applications. However, a problem that exists with services is that they are often designed to expose functionality of individual applications and thus are too limited to be efficient building blocks for enterprise-wide business processes.

An answer to this shortfall has been the migration to a Service Oriented Architecture (SOA). The SOA is an open architecture middleware, which builds on the benefits of services. An example of an SOA can be found in the Enterprise Service Framework (ESF), which is commercially available from SAP AG, Walldorf, Germany. The term "SOA" may also be used to refer to "distributed objects" architecture, such as CORBA (Common Object Request Broker Architecture) and DCOM (Distributed Component Object Model).

The SOA enables the abstraction of business objects (BO), modeled as services (also referred to as enterprise services), from actual applications. Aggregating services into business-level enterprise services may provide more meaningful building blocks for the task of automating enterprise-scale business scenarios. Enterprise services allow IT organizations to efficiently develop composite applications, which may be defined as applications that compose functionality and information from existing systems to support new business processes or scenarios.

The SOA also enables the use of an enterprise services repository. The enterprise services repository stores relevant pre-existing enterprise services and makes them available to selected partners and customers. By using the enterprise services repository, these selected partners and customers can use the pre-existing enterprise services to aid in the implementation of new services and corresponding business objects. An "object" refers to a software bundle of variables (e.g., data) and related methods. For example, in object-oriented programming, an object is a concrete realization (instance) of a class that consists of data and the operations associated with that data. The term business object (BO) thus represents a data structure, such as an object, having significance to a business (e.g. a business object for providing a purchase order).

When services and business objects are developed, the fields which may be filled in with values at a user interface may be defined within the business object and may be fixed for the lifetime of the application providing the business object. For example, a business object for a purchase order may have a field for the purchase order id and a field for the date. If these fields need to be updated or changed, however, each business object that contains the values must be updated as well. As such, there is a need to improve development of business objects and their corresponding values.

SUMMARY OF THE INVENTION

The present invention provides methods and apparatus, including computer program products, for determining default values for business objects.

In one exemplary embodiment, there is provided a method for providing default values for attributes of business objects. The method may comprise receiving, at a first service provider, a call to instantiate a first business object. The method may then obtain a static default value of an attribute associated with the first business object. A second service provider may be called to determine a dynamic default value for the attribute based on the static default value. The first service provider may then be provided with the dynamic default value for use when instantiating the first business object.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings.

DESCRIPTION OF THE EMBODIMENTS

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
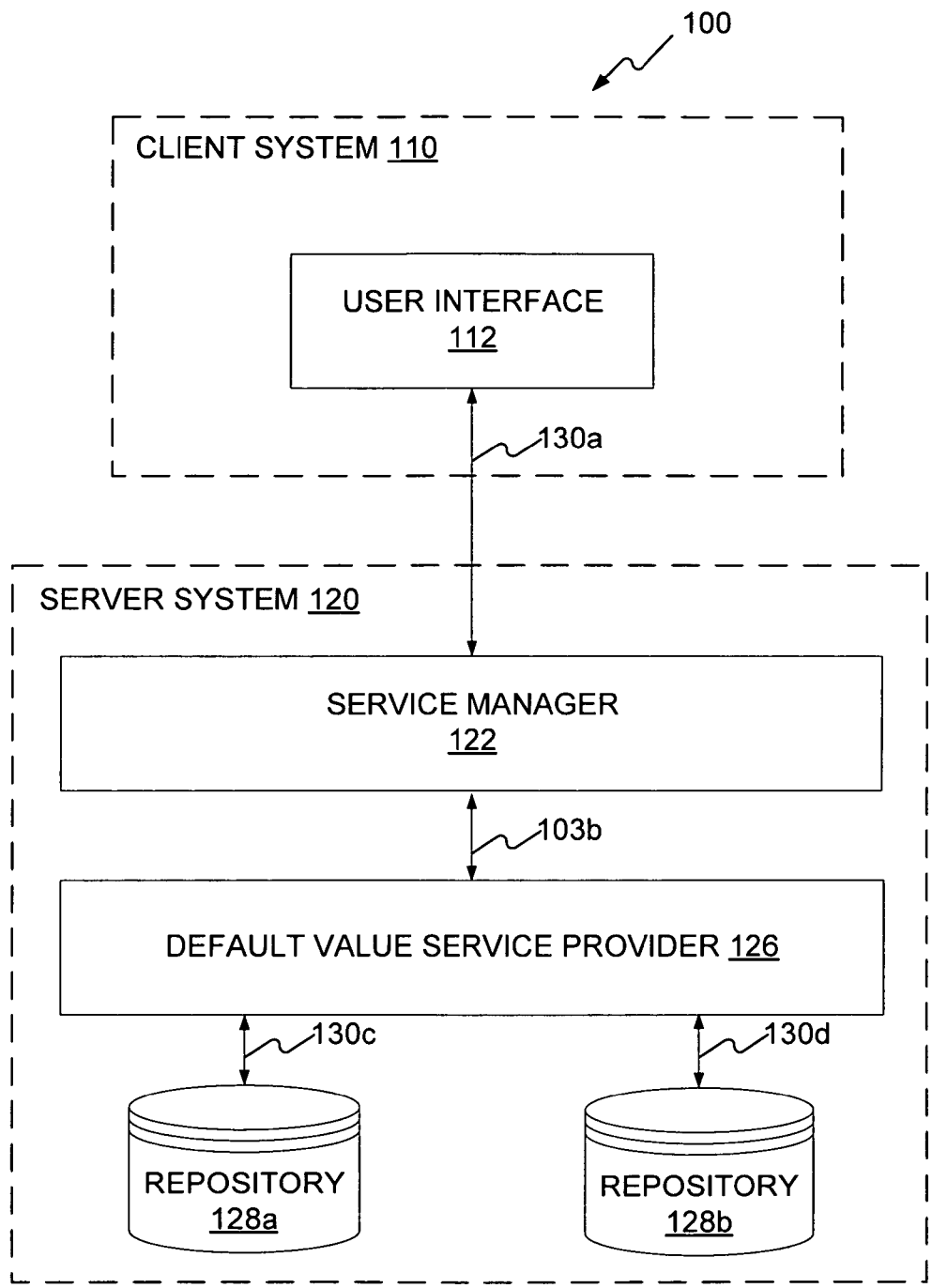
FIG. 1 illustrates a block diagram of an exemplary system environment consistent with certain aspects related to the present invention.

FIG. 1 is a block diagram of an exemplary system 100 environment that includes a client system 110 and a server system 120 for generating business objects. Client system 110 includes a user interface (UI) 112. Client system 110 connects to server system 120 through network connection 130a. Server system 120 further includes a service manager (SM) 122, a default value service provider 126, and repositories 128a and 128b.

System 100 may be implemented as part of an enterprise services framework (ESF). An enterprise services framework is a type of computer framework, such as a client-server architectural framework, that includes one or more services, such as service provider 126. The services are accessible to other parts of the ESF, such as client systems and their corresponding users, through a communication mechanism such as the Internet or an intranet. The ESF may be constructed using tools provided by SAP Netweaver™ (commercially available from SAP AG, Walldorf, Germany). Although FIG. 1 shows a single client system 110 and a single server system 120, a plurality of client systems and server systems may be used. Moreover, the components depicted in FIG. 1 may be distributed among multiple locations. Although FIG. 1 is described with respect to a client-server architecture and an ESF, system 100 can also use any other architecture or framework.

Client system 110 may include one or more processors, such as computers, to interface with server system 120. User interface 112 may provide an interface to allow a user to interact, through service manager 122, with other applications, such as service provider 126 and its corresponding business objects stored in repositories 128a, 128b. Moreover, a service other than service provider 126 may call default value service provider 126 to obtain default value data.

Default value data may be information, such as values, to help a user perform a task (e.g. complete a purchase order). The default values may be either static default values or dynamic default values. The static default values may be values stored in, for example, repository 128b. The dynamic default values may be determined by default value service provider 126 based on values that may also be stored in repository 128b. Default value service provider 126 may determine the dynamic values based on a state of system 100, such as the role of the user or the current date. For example, when user interface 112 provides a file search, it may include a field for a date range to be applied for the search. System 100 may provide a default value for the date field, such as a range covering the current calendar month.

A user may be any type of user, such as a system designer, a software developer, and/or a processor. User interface 120 may include a browser to provide content from service provider 126. In some implementations, SAP Web Dynpro (commercially available from SAP AG, Walldorf, Germany) is used as a model-based development environment for generating user interface 112, although other development environments can also be used.

Network connections 130a-130d may include, alone or in any suitable combination, a telephony-based network, a local area network (LAN), a wide area network (WAN), a dedicated intranet, wireless LAN, the Internet, an intranet, a wireless network, a bus, or any other communication mechanisms. Further, any suitable combination of wired and/or wireless components and systems may provide network connections 130a-130d. Moreover, network connections 130a-130d may be embodied using bi-directional, unidirectional, or dedicated communication links. Network connections 130a-130d may also implement standard transmission protocols, such as Transmission Control Protocol/Internet Protocol (TCP/IP), Hyper Text Transfer Protocol (HTTP), SOAP, RPC, or other protocols.

Server system 120 may include one or more processors, such as computers, to interface with other computers, such as client system 110. Client system 110 may call service manager 122 at server 120. Although service manager 122, service provider 126, and repositories 128a, 128b are depicted within server 120, they can each be located anywhere and/or distributed among multiple locations. Further, while FIG. 1 shows one service provider 126, systems consistent with the invention may use multiple service providers by, for example, separating the default value functions of default value service provider 126 from the standard service operations performed by service provider 126.

When service manager 122 is called by user interface 112, service manager 122 may call a procedure to instantiate service provider 126. As used herein, the term "instantiate" means, in an object oriented programming environment, instantiating an object of a particular class, and, more generally, may include deploying, customizing, running, and/or executing an application. Service provider 126 may be implemented as a service which may be called by service manager 122. An example of a service is a Web service, although any other type of application accessible through a network may be used. When service provider 126 is instantiated by service manager 122, service provider 126 may also instantiate one or more corresponding business objects. For example, a user of user interface 112 may access service provider 126 to interact with a product catalog or sales order. The data and methods associated with providing the product catalog or sales order to user interface 112 correspond to a business object. A business object may also include a business object node, which refers to a portion of the business object. In some instances, a business object may be implemented as a data structure including methods and/or procedures associated with that data. Returning to the above product catalog example, a business object node may refer to another object, such as a price or a product description, included within the business object. Business objects and nodes may be stored in a repository, such as repositories 128a.

Repositories 128a, 128b may be implemented as a storage device for storing information associated with business objects including their metadata. Repositories 128a, 128b may store information associated with the business objects (e.g., the data and methods associated with the product catalog or sales order) including metadata for the business objects. For example, repositories 128a, 128b may store a list of business object nodes including an identifier (ID) and data content. The ID of a business object may refer to an identifying memory address of a business object node that uniquely identifies individual business object nodes within repositories 128a, 128b. The memory address can be used to access and read data content of a particular business object node. For example, an ID of a business object node may consist of a directory structure and filename associated with the business object node.

Repositories 128a, 128b may be implemented as an enterprise services repository, although any other computer-readable storage medium may be used. Further, while FIG. 1 shows two repositories 128a, 128b, systems consistent with the invention may use only a single repository by, for example, combining repositories 128a and 128b into one.

Repositories 128a, 128b may also store metadata regarding one or more business objects. Metadata, in general terms, may be defined as data about data. For example, metadata may refer to information about the data itself, such as content, quality, condition, origin, size, formatting, characteristics of data, and the like. The eXtensible Markup Language (XML) is a specific example of metadata because it is a format used to define other data objects. Metadata may include a schema. A schema may reflect the organization or structure, such as the organization of a database or the structure of an object in an object oriented program. In object oriented programming, modeling (i.e., the analysis of objects that are used in a business or other context and the identification of the relationships among these data objects) leads to a schema, which can be stored in repositories 128a, 128b as a schema. The schema can be depicted visually as a structure or a formal text-oriented description (e.g., script). For example, metadata may be in the form of database tables. The metadata may include information such as the number of nodes in a business object, the name(s) of the nodes, the position of a node in the business object hierarchy (e.g., a root node or a sub-node), the structure of a node, associations, actions, and default queries on a node.

Figure 2:
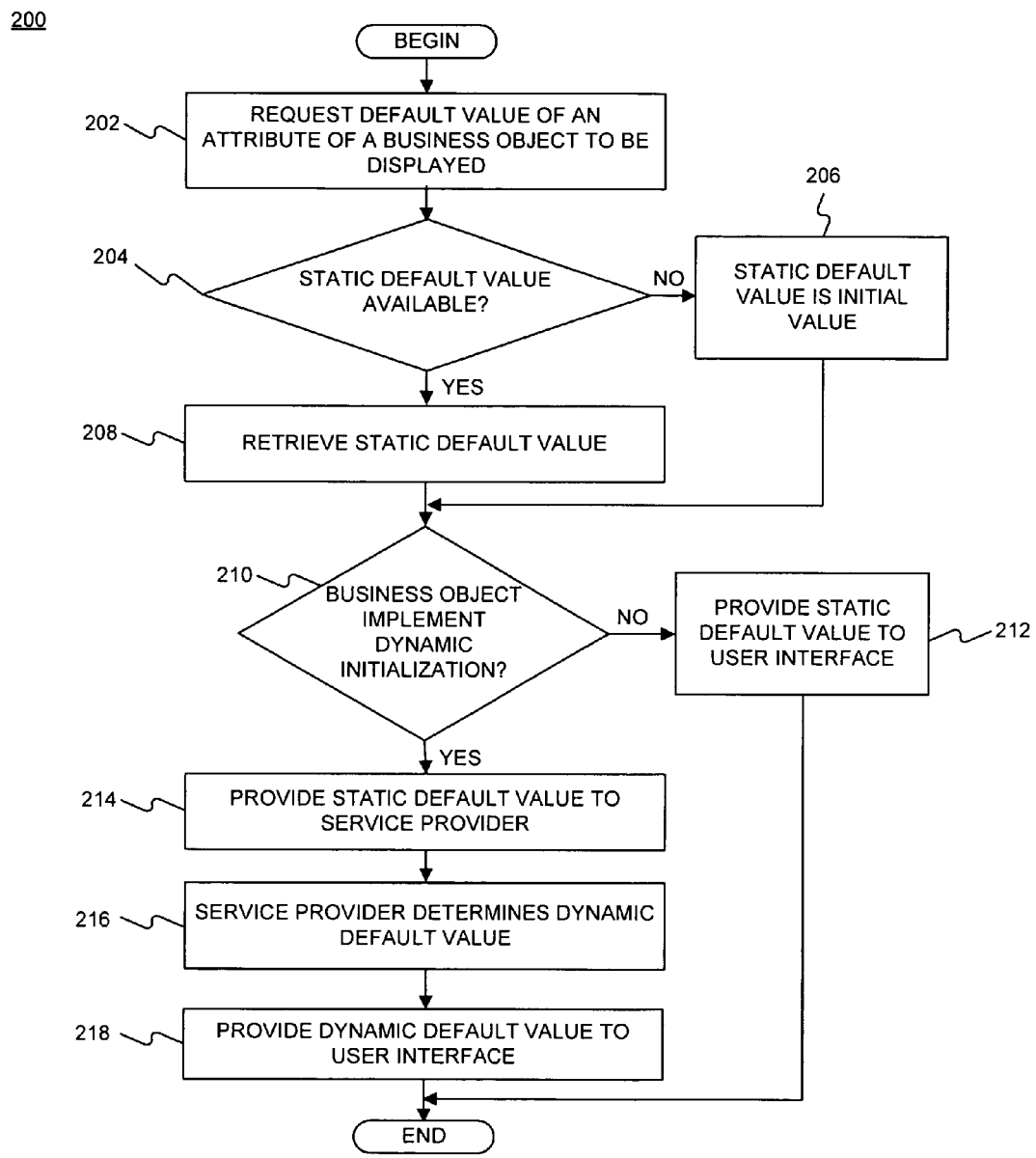
FIG. 2 illustrates an exemplary flow diagram for generating values of a user interface consistent with the present invention.

FIG. 2 illustrates an exemplary flow diagram of a process 200 for generating values of a business object displayed on a user interface, consistent with the present invention. For example, user interface 112 may display data relating to a business object, such as a business object for a sales order. When displaying business object data, user interface 112 may populate the business object's data structure with default values in, for example, predefined fields of the displayed data structure. User interface 112 may receive a default value in a variety of situations, such as when generating a new display structure, when acting on a modification made by the user, or when responding to an action made by the user.

At runtime, user interface 120 may call service manager 140. Service manager 140 may then call a procedure to instantiate service provider 160. When service provider 160 is instantiated, service provider 160 may also instantiate one more business objects for a sales order. The business objects, which include business object nodes, may be stored in repository 128a.

At runtime, service provider 126 receives a call, such as a SOAP message, Remote Procedure Call (RPC), or any other type of call, from service manager 122 to instantiate a business object. Service provider 126 may instantiate one or more business objects in repository 128a. For example, the one or more business objects may include a sales order. As shown in FIG. 2, process 200 may begin by default value service provider 126 receiving a request or trigger for a default value of an attribute of a business object called for instantiation by service provider 126 (stage 202). The attribute may, for instance, correspond to a date, price, or product field of a business object reflecting a sales order. In response to the request, default value service provider 126 may determine if a static default value of the attribute is available (stage 204). To this end, default value service provider 126 may access repository 128b to determine whether it contains a static default value of the particular attribute.

If repository 128b does not contain a static default value for the particular attribute (stage 204, No), then server system 120 may return an initial value of the attribute to user interface 112 (stage 206). The initial value may be based on the data type of the particular attribute. For instance, if the attribute is an integer data type, then the initial value may be zero. If the attribute is a character string, then the initial value may be a blank. If repository does contain a static default value for the particular attribute (stage 204, Yes), then server system 120 may retrieve the static default value from repository 128b (stage 208).

In systems consistent with the invention, system 100 may also dynamically initialize attributes of business objects to a default value. System 100 may perform dynamic initialization for only certain types of business objects or predefined business objects. Accordingly, system 100 may determine whether dynamic initialization is provided for the particular business object (stage 210). For example, the particular business object may be associated with an object type or ID, either of which may be used to indicate to server system 120 that the particular business object may provide for dynamic initialization of default values.

If system 100 does not provide for dynamic initialization (stage 210, No), then server system 120 provides the static default value to user interface 112 (stage 212). User interface 112 will then receive the static default value and display it to the user in the corresponding data field for the attribute. If, on the other hand, system does provide for dynamic initialization (stage 210, Yes), then server system 120 may provide the static default value determined in stages 206 and 208 to default value service provider 126, which may then determine the dynamic default value for the particular attribute (stages 214 and 216). For example, the static value may be an initial value that is adjusted during the process of dynamically determining the default value.

Exemplary implementations consistent with the invention for dynamically determining the value of an attribute are described in greater detail below with respect to FIGS. 3-6. Once default value service provider 126 determines the default values, it may incorporate the default values when instantiating the particular business object. Service provider 126 may also instantiate additional business objects to incorporate the default values. Once the additional business objects are instantiated, the instantiated business object with default values may be provided to user interface 112 for display (stage 218).

Figure 5:
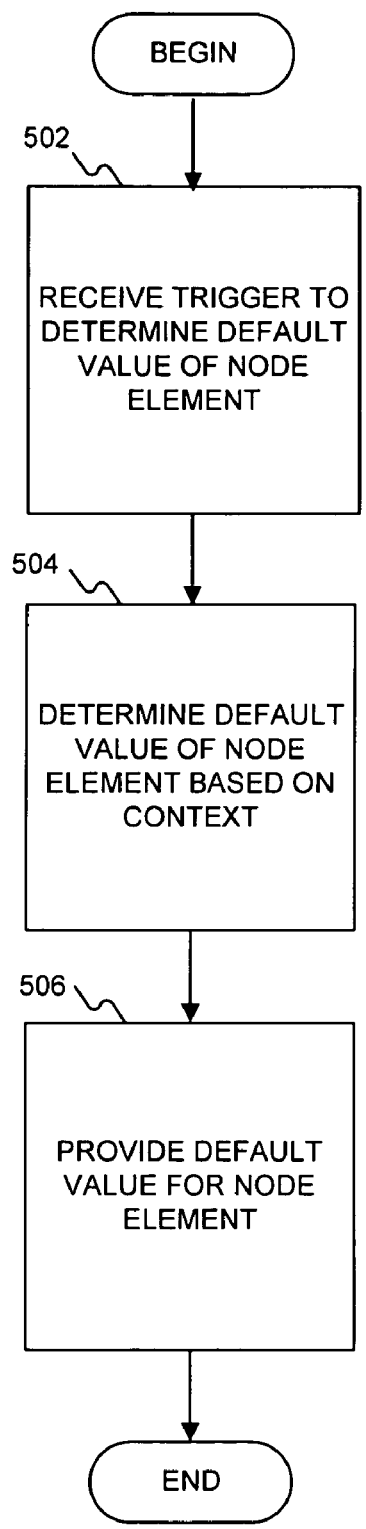
FIG. 5 illustrates an exemplary flow diagram for determining default values for a node element.
Figure 6:
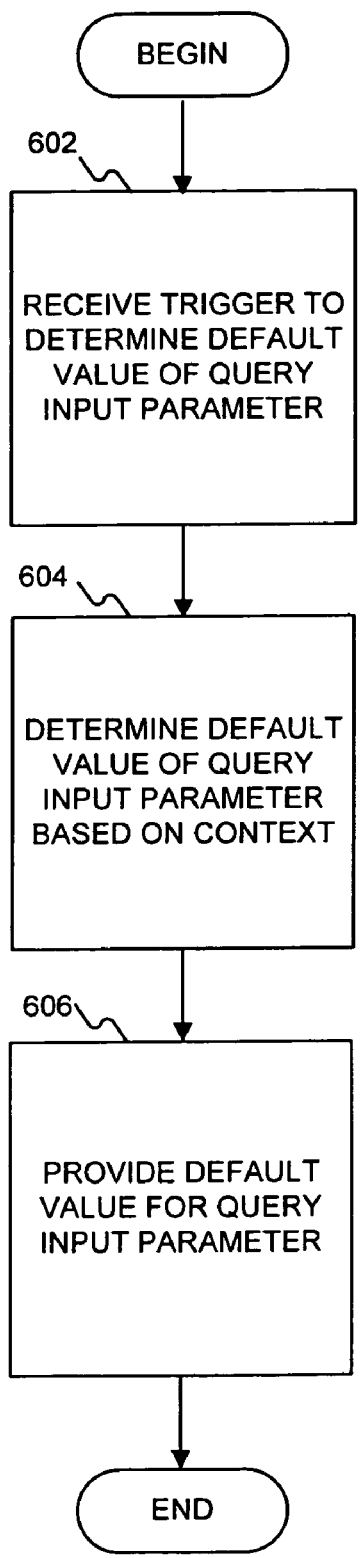
FIG. 6 illustrates an exemplary flow diagram for determining default values for a query input parameter.

As noted above, FIGS. 3-6 further illustrate exemplary implementations of processing stage 216. In particular, FIG. 3 illustrates an exemplary process for node attributes, FIG. 4 illustrates an exemplary process for association filter attributes, FIG. 5 illustrates an exemplary process for node elements, and FIG. 6 illustrates an exemplary process for query input parameters.

Figure 3:
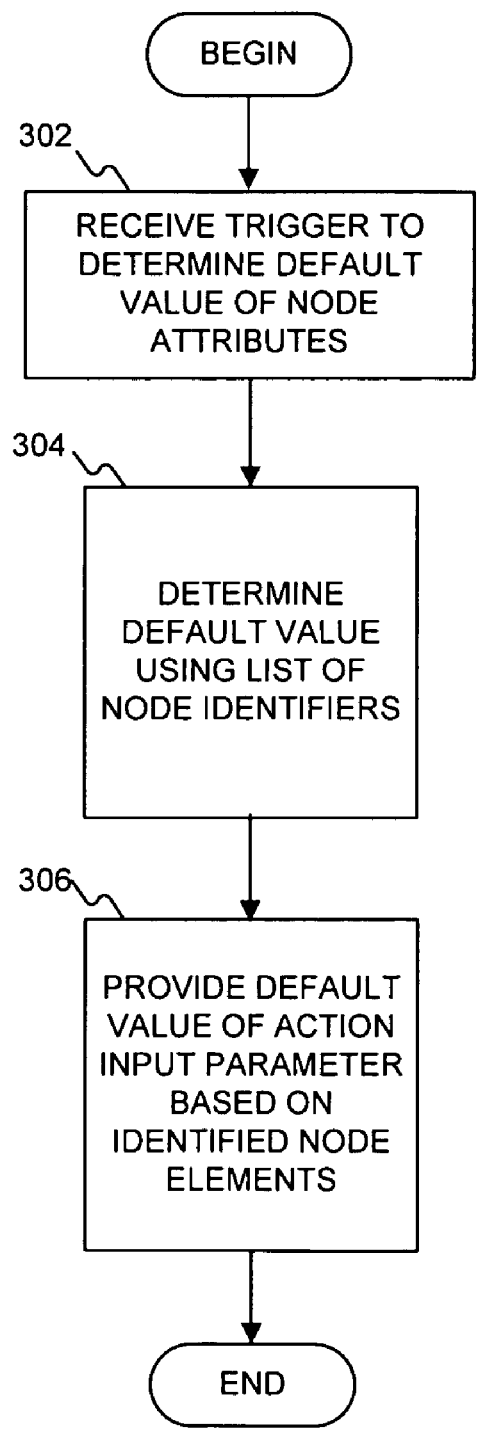
FIG. 3 illustrates an exemplary flow diagram for determining default values for a node attribute.

Turning to FIG. 3, it illustrates an exemplary flow diagram of a process 300 for determining default values for an action input parameter. As shown in FIG. 3, default value service provider 126 may receive a call or trigger to determine a default value of one or more node attributes (stage 302). Service provider 126 may receive the trigger as part of instantiating a business object during runtime for display on user interface 112. Service provider 126 may receive the trigger when the state of system 100 requires or allows for the inclusion of a default value in a data structure displayed on user interface 112. The trigger may include an ID of the particular business object node. Default value service provider 126 may determine, based on this ID, that the node attribute is an action input parameter.

Default value service provider 126 may then determine the default value of the action input parameter according to a list of node identifiers (stage 304). For instance, the received trigger may also identify a particular action that is to be taken and a list of business object nodes upon which server system 120 is to execute the action. As an example, the action may be to display all sales orders for a particular day. From the content of the assigned node identifiers, default value server provider 126 may determine the default value(s) for the action input parameter. In exemplary embodiments consistent with the invention, repository 128b may include a lookup table containing default values for corresponding lists of business object node identifiers. Continuing with the above example, the action input parameter may then be the current date. Default value server provider 126 may then provide the determined default values (stage 306) when instantiating the business object or business object nodes for display via user interface 112.

Figure 4:
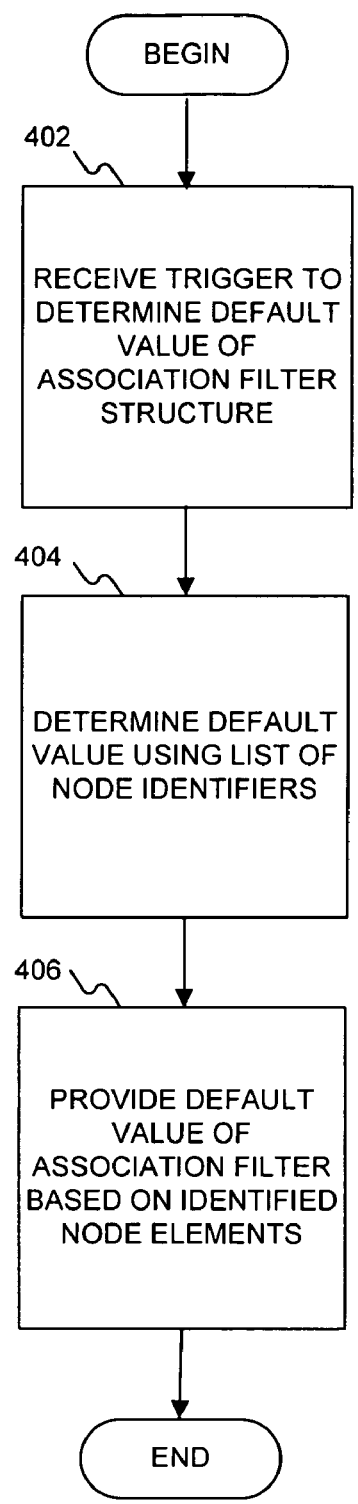
FIG. 4 illustrates an exemplary flow diagram for determining default values for an association filter attribute.

FIG. 4 illustrates an exemplary flow diagram for determining default values for an association filter attribute. An association filter attribute, as known to those skilled in the art, may indicate how user interface 112 may navigate between nodes of a business object. For example, the association may reflect an instruction to navigate to all sales orders for a particular day. As shown in FIG. 4, default value service provider 126 may receive a call or trigger to determine a default value of one or more node attributes (stage 402). Service provider 126 may receive the trigger as part of instantiating a business object during runtime for display on user interface 112. Service provider 126 may receive the trigger when the state of system 100 requires or allows for the inclusion of a default value in a data structure displayed on user interface 112. Default value service provider 126 may then determine the default value of the association filter attribute according to a list of node identifiers (stage 404). For instance, the received trigger may identify a list of business object nodes upon which server system 120 is to interact or navigate according to the association filter attribute. From the content of the assigned node identifiers, default value server provider 126 may determine the default values. Continuing with the above example for navigating to all sales orders for a particular day, the action input parameter may determined to be the current date. In exemplary embodiments consistent with the invention, repository 128b may include a lookup table containing default values for corresponding lists of business object node identifiers.

Default value server provider 126 may then provide the determined default values (stage 406) when instantiating the business object or business object nodes for display via user interface 112.

FIG. 5 illustrates an exemplary flow diagram for determining default values for a node element. As shown in FIG. 5, default value service provider 126 may receive a call or trigger to determine a default value of a node element (stage 502). Service provider 126 may receive the trigger as part of instantiating a business object during runtime for display on user interface 112. Service provider 126 may receive the trigger when the state of system 100 requires or allows for the inclusion of a default value in a data structure displayed on user interface 112.

Default value service provider 126 may determine the default value of the node element based on its context in the business object structure (stage 504). The context of the node element may be determined from information provided by the user or the context of the service. For example, if the user inputs Germany ("DE") as the destination country for the sales order, default value service provider 126 may be called to determine default values based on this context. In this example, default value service provider 126 may return, for the context "DE," a complete list of the regions (also referred to as provinces) associated with the country code "DE" determined at runtime. Default value server provider 126 may then provide the determined default values (stage 506) when instantiating the business object or business object nodes for display via user interface 112.

FIG. 6 illustrates an exemplary flow diagram for determining default values for a query input parameter. A query input parameter may define what other types of values are displayed on user interface 112. As shown in FIG. 6, default value service provider 126 may receive a call or trigger to determine a default value of a query input parameter (stage 602). Service provider 126 may receive the trigger as part of instantiating a business object during runtime for display on user interface 112. Service provider 126 may receive the trigger when the state of system 100 requires or allows for the inclusion of a default value in a data structure displayed on user interface 112.

Default value service provider 126 may determine the default value of the query input parameter based on its context in the business object structure (stage 604). For instance, a user may query for sales orders over a certain date range. In exemplary embodiments consistent with the invention, repository 128b may include a lookup table containing default values for corresponding types of contexts. In this example, when a user selects a date range query, server system 120 may initialize the date range query based on the current date (e.g., one month from the current date). Default value server provider 126 may then provide the determined default values (stage 606) when instantiating the business object or business object nodes for display via user interface 112.

For purposes of explanation only, certain aspects and embodiments are described herein with reference to the components illustrated in FIGS. 1-6. The functionality of the illustrated components may overlap, however, and may be present in a fewer or greater number of elements and components. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Further, the sequences of events described in FIGS. 1-6 are exemplary and not intended to be limiting. Thus, other method steps may be used, and even with the methods depicted in FIGS. 1-6, the particular order of events may vary without departing from the scope of the present invention. Moreover, certain steps may not be present and additional steps may be implemented in FIGS. 1-6. Also, the processes described herein are not inherently related to any particular apparatus and may be implemented by any suitable combination of components. For example, systems consistent with the invention may use automated or manual correction procedures other than those using a reconciliation message.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing default values for attributes of business objects, the method comprising:
   receiving a call at a first service provider to instantiate a first business object;
   obtaining a static default value of an attribute associated with the first business object;
   calling a second service provider to determine a dynamic default value for the attribute based on the static default value; and
   providing the dynamic default value to the first service provider for use when instantiating the first business object.

2. The method of claim 1, wherein the first service provider and the second service provider are the same service provider.

3. The method of claim 1, wherein the static default value has a value based on a data type of the attribute.

4. The method of claim 3, wherein the static default value is a predetermined integer if the attribute is an integer data type.

5. The method of claim 3, wherein the static default value is at least one of a predetermined character or a blank if the attribute is a character string data type.

6. The method of claim 1, wherein the attribute is at least one of an action input parameter or an association filter attribute, and wherein the second service provider determines the dynamic default value based on a list of nodes identified associated with the action input parameter or association filter attribute.

7. The method of claim 1, wherein the attribute is at least one of a node element or a query input parameter, and wherein the second service provider determines the dynamic value based on a context in which the node element or the query input parameter is used.

8. A computer-readable medium containing instructions to configure a processor to perform a method for providing default values for attributes of business objects, the method comprising:
   receiving a call at a first service provider to instantiate a first business object;
   obtaining a static default value of an attribute associated with the first business object;
   calling a second service provider to determine a dynamic default value for the attribute based on the static default value; and
   providing the dynamic default value to the first service provider for use when instantiating the first business object.

9. The computer-readable medium of claim 8, wherein the first service provider and the second service provider are the same service provider.

10. The computer-readable medium of claim 8, wherein the static default value has a value based on a data type of the attribute.

11. The computer-readable medium of claim 10, wherein the static default value is a predetermined integer if the attribute is an integer data type.

12. The computer-readable medium of claim 10, wherein the static default value is at least one of a predetermined character or a blank if the attribute is a character string data type.

13. The computer-readable medium of claim 8, wherein the attribute is at least one of an action input parameter or an association filter attribute, and wherein the second service provider determines the dynamic default value based on a list of nodes identified associated with the action input parameter or association filter attribute.

14. The computer-readable medium of claim 8, wherein the attribute is at least one of a node element or a query input parameter, and wherein the second service provider determines the dynamic value based on a context in which the node element or the query input parameter is used.

15. A system for providing default values for attributes of business objects, the system comprising:
   a processor; and
   a memory, wherein the processor and the memory are configured to perform a method comprising:
      receiving a call at a first service provider to instantiate a first business object;
      obtaining a static default value of an attribute associated with the first business object;
      calling a second service provider to determine a dynamic default value for the attribute based on the static default value; and
      providing the dynamic default value to the first service provider for use when instantiating the first business object.

16. The system of claim 15, wherein the first service provider and the second service provider are the same service provider.

17. The system of claim 15, wherein the static default value has a value based on a data type of the attribute.

18. The system of claim 17, wherein the static default value is at least one of a predetermined integer when the attribute is an integer data type, or a predetermined character or blank when the attribute is a character string data type.

19. The system of claim 15, wherein the attribute is at least one of an action input parameter or an association filter attribute, and wherein the second service provider determines the dynamic default value based on a list of nodes identified associated with the action input parameter or association filter attribute.

20. The system of claim 15, wherein the attribute is at least one of a node element or a query input parameter, and wherein the second service provider determines the dynamic value based on a context in which the node element or the query input parameter is used.

* * * * *